No. 752,872. PATENTED FEB. 23, 1904.
D. STANSELL & X. GEE.
APPARATUS FOR CLEANING COTTON SEED.
APPLICATION FILED NOV. 9, 1903.
NO MODEL. 2 SHEETS—SHEET 2.
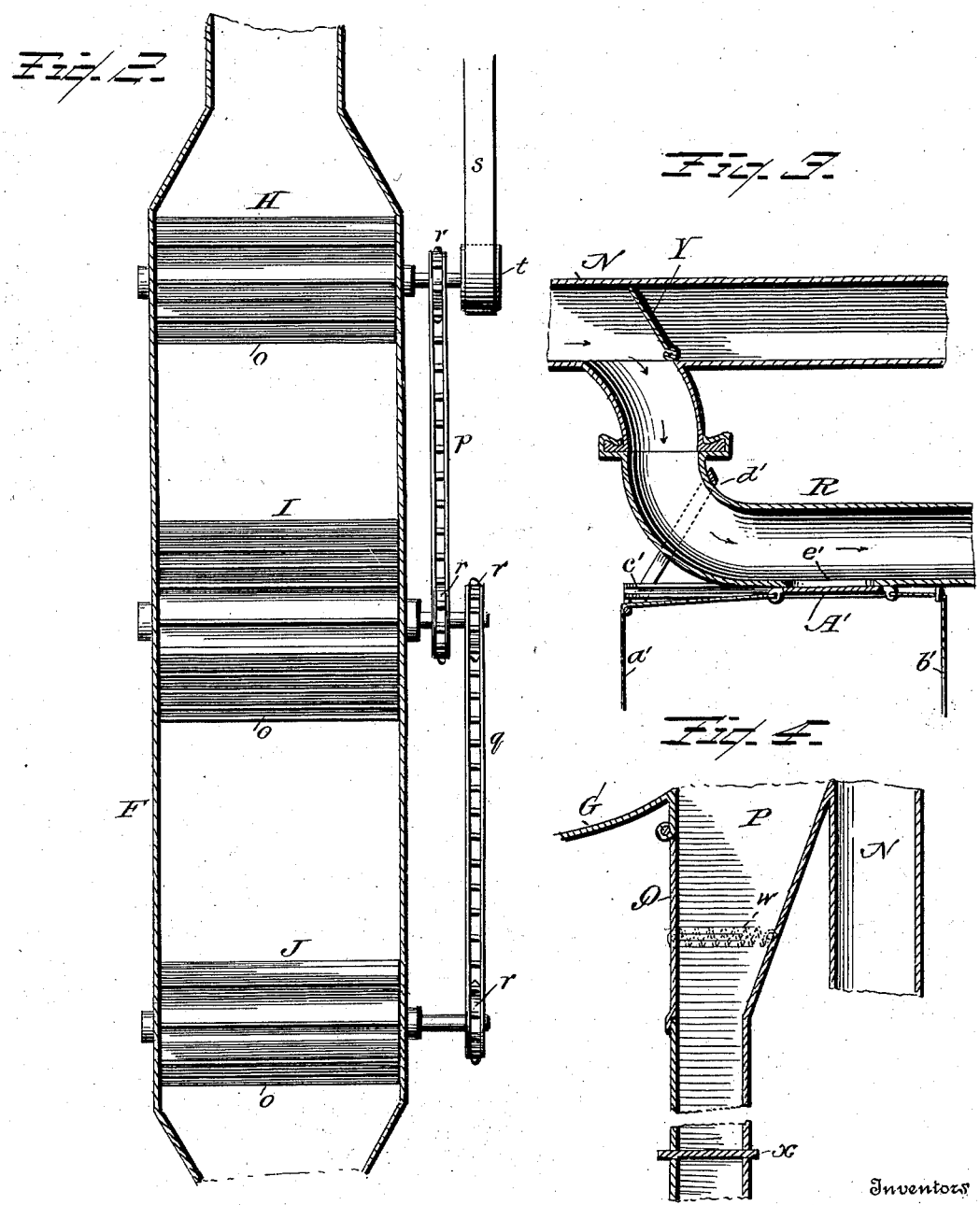

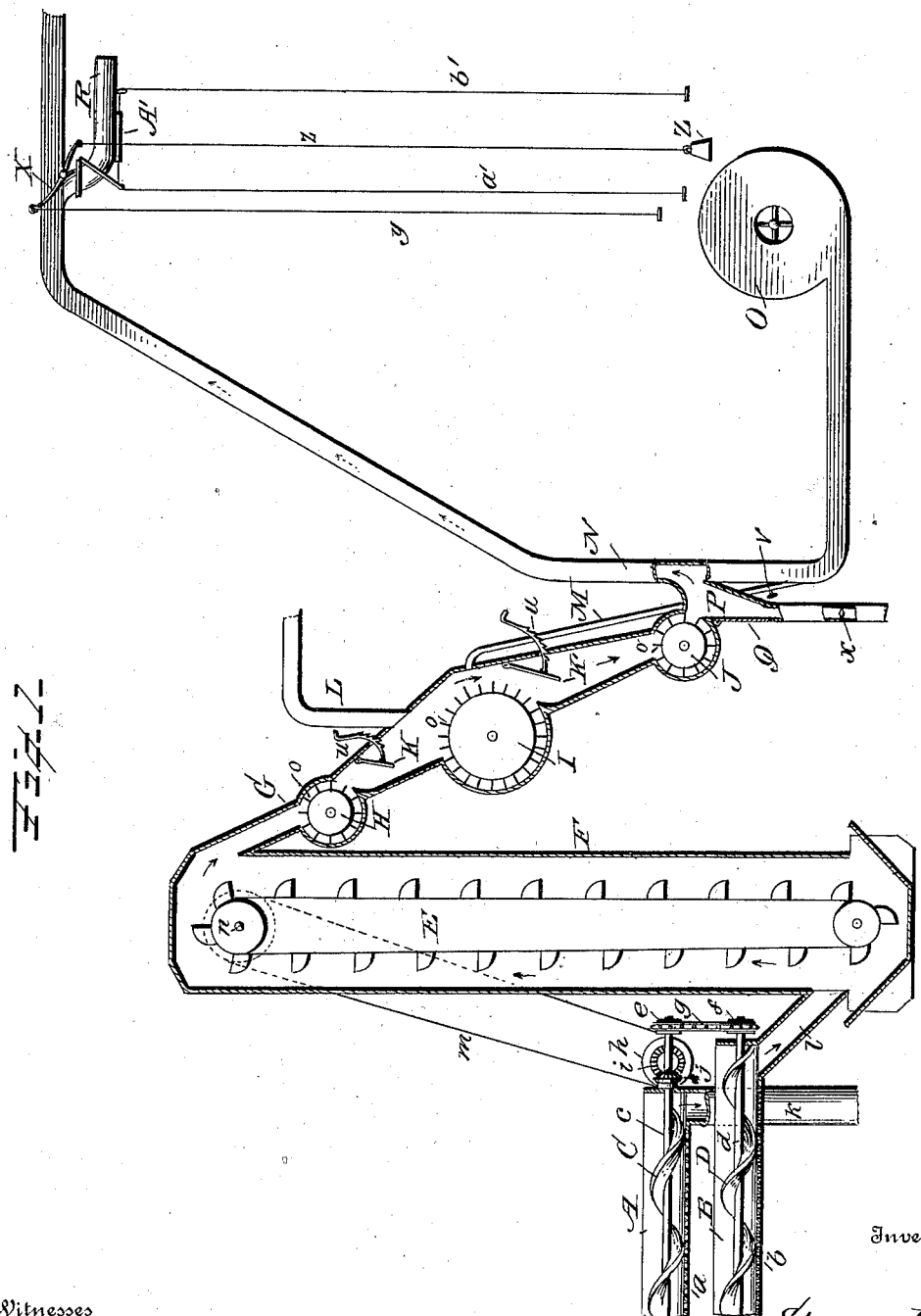

No. 752,872. Patented February 23, 1904.

UNITED STATES PATENT OFFICE.

DONOVAN STANSELL AND XEN GEE, OF STROUD, OKLAHOMA TERRITORY.

APPARATUS FOR CLEANING COTTON-SEED.

SPECIFICATION forming part of Letters Patent No. 752,872, dated February 23, 1904.

Application filed November 9, 1903. Serial No. 180,410. (No model.)

*To all whom it may concern:*

Be it known that we, DONOVAN STANSELL and XEN GEE, citizens of the United States, residing at Stroud, in the county of Lincoln and Territory of Oklahoma, have invented certain new and useful Improvements in Apparatus for Cleaning Cotton-Seed; and we do hereby declare that the following is a full, clear, and exact description of the same, reference being had to the annexed drawings, making a part of this specification, and to the letters of reference marked thereon.

The present invention has for its object to provide means for cleaning cotton-seed to be used in oil-mills and in which the seed will be thoroughly and perfectly cleaned in large quantities in a comparatively short space of time and in a most expeditious manner; and it consists in an apparatus constructed substantially as shown in the drawings and hereinafter described and claimed.

Figure 1 of the drawings is a side elevation, partly in section, of a grain-cleaning apparatus constructed in accordance with our invention and showing also one of the many forms of distributing devices that may be used in connection therewith; Fig. 2, an enlarged view, partly in section, showing that portion of the apparatus containing the rotatable beaters and means for operating them; Fig. 3, a detail sectional view of the distributing mechanism that may be used in connection with our improved apparatus; Fig. 4, a similar view of the spout with spring-actuated door to receive the heavy particles separated from the seed and prevent the choking up of the spout by the accumulation thereof.

In the accompanying drawings, A B represent two troughs or hoppers arranged one above the other on the same vertical plane and are each provided with a suitable screen-bottom, the bottom $a$ of the trough or hopper A being of much coarser mesh than the bottom $b$ of the trough or hopper B.

The troughs or hoppers A B contain rotatable conveyers C D, respectively, which are preferably in the form of spiral screws, but may be of any suitable construction found most desirable, the shafts $c$ $d$ thereof having suitable sprocket-wheels $e$ $f$, respectively, and with which engages a sprocket-chain $g$, motion being imparted to the two shafts through a rotatable pulley $h$, carrying a face-gear $i$, with which a pinion $j$ on the shaft $c$ engages.

The trough or hopper A is provided with a discharge-spout $k$ for the foreign substances after being separated from the seed, and the trough or hopper B is provided with a spout $l$, through which the seed passes to a suitable elevator E of any preferred construction and which is contained in a suitable hollow shaft or casing F and has motion imparted to it through the medium of a belt $m$, engaging the pulley $h$ and a pulley upon the shaft $n$ at the upper end of the elevator.

Any suitable means may be employed for imparting motion to the conveyers and to the elevator, and in this respect the invention is susceptible of many changes and modifications, as well as the form of conveyers and elevator, this being left entirely with the judgment of the manufacturer.

A casing G communicates with the upper end of the casing F and is disposed on an incline from a perpendicular and is so formed and constructed as to contain the three rotatable beaters H I J, which beaters may be of any suitable form and construction, but preferably of radial blades $o$, connected to a cylinder, as shown in Figs. 1 and 2 of the drawings. These beaters may be operated in any well-known and preferred manner, and one of many means is shown in the sprocket-chains $p$ $q$, engaging sprocket-wheels $r$ on the shafts of the beaters, and a belt $s$, engaging a pulley $t$ on one of the shafts, as shown in Fig. 2 of the drawings.

Within the casing G are hinged deflectors K, which are rendered adjustable by means of toothed segmental rods $u$, said rods being hinged to the back of the deflectors and extend through holes in casing, the teeth upon the rods engaging the wall of said casing around the holes, or, if desired, any other convenient means may be employed for rendering the deflectors adjustable, so that their angle may be changed and held in their adjusted position, as circumstances may require.

A dust-flue L communicates with the casing G at a point between the beaters H I, and an ejector-pipe M communicates with the casing directly opposite the beater I and extends down and communicates with the conductor-pipe N, which pipe may be square or any other suitable form found most desirable.

The conductor-pipe N is provided with a suitable air-forcing device, such as a rotatable fan-blower O, which may be of the ordinary construction and operated in the usual manner, and the ejector-pipe M is provided with a suitable valve $v$, whereby the air forced into the casing G may be regulated.

A discharge-spout P communicates with the casing G at the lower end thereof and is provided with a spring-actuated or automatically-acting door Q, said door in the present instance being hinged to the spout and held closed by a suitable spring $w$. (Shown in dotted lines of Fig. 4 of the drawings.) This door being automatic in its action, any outward pressure thereon will cause said door to open and allow the discharge of the seed therethrough should the seed accumulate in the spout by the stopping of the fan-blower or for other causes, and any construction of door that will automatically operate for the purpose above described would be considered an equivalent thereto.

The discharge-spout P may have a suitable slide $x$ or other desirable means for convenience of removing the contents of the spout when desired, said spout being located between the casing G and the conductor-pipe N and communicates therewith. Thereby provision is made for removing from the spout the heavy particles that have accumulated therein, such as nails, &c.

The conductor-pipe N extends up a suitable distance and thence horizontally along the top of the seed-house, whereby the seed is conducted and distributed to any point desired by means of a swiveled distributing-spout R, as shown in Figs. 1 and 3 of the drawings.

Any number of the distributing-spouts may be used, and said spouts may be swiveled to the conductor-pipe in any suitable and well-known manner, this being left discretionary, and the manner of swiveling or connecting the spout with the conductor-pipe may be variously modified or changed, as circumstances would require. The seed is conducted into the distributing-spout by a suitable valve Y, located in the conductor-pipe, the seed passing from the pipe into the spout, as indicated by the arrows in Fig. 3 of the drawings. A similar valve is provided for each distributing-spout used, the valve serving as a deflector to check the course of the seed and cause it to enter the distributing-spout, and the opening in the spout would be closed by said valve when desired to use the preceding spout, so that the seed will pass over the first spout into the second.

It is not thought necessary to show over one of said distributing-spouts, as the other spouts would be similar in construction and simply duplicates of each other.

In order to operate the distributing-spout and also the valve in the conductor-pipe, the valve has connected to it a lever X, which has connected to its opposite ends suitable cords or chains $y\ z$, so that by pulling down on the proper cord the valve will be closed or opened, as the case may be.

A suitable weight Z may be engaged upon the end of either cord or chain $y\ z$, so that the valve Y will be held closed or open for any desired length of time or as circumstances require. The distributing-spout R is in like manner operated by similar cords or chains, the same being shown at $a'\ b'$, the ends of the cords or chains being attached to a suitable slide A', which operate the slide and also serve to operate the distributing-spout. This slide A' is supported in grooved guides $c$, supported at its free ends by a suitable yoke $d'$, or any suitable means may be employed for connecting the slide to the distributing-spout, as we do not wish to confine the invention to any special construction of valve, slide, or the means employed for operating them, as this is left optional and changes may be made as found necessary.

The slide A' opens or closes the discharge $e'$ and is manipulated by the cords or chains $a'\ b'$—as, for instance, if the seed is desired to be deposited in a small radius in the center of the seed-house it can be accomplished by pulling down on the cord or chain $a'$, which will open the slide A' and allow the seed to pass out through the discharge $e'$ at the bottom of the distributing-spout R, and by pulling down on the cord or chain $b'$ the slide will close the discharge and the spout swung around to the desired position to discharge the seed.

In describing in detail the construction of the distributing device we wish it distinctly understood that any suitable means may be employed for distributing the seed after being cleaned by our improved apparatus, the means shown being one of many devices that may be employed for the purpose.

In the operation the seed is unloaded from the wagon or cars into the trough or hopper A and by means of the rotatable conveyer C the seed is agitated and carried forward and falls through the meshes of the screen-bottom or the perforations thereof and into the trough or hopper B, from whence it is carried forward and delivered to the spout $l$ by the rotatable conveyer D. During this action upon the seed the foreign matter or substances that do not pass through the screen-bottom of the trough or hopper A will be carried by the rotatable conveyer C to the discharge-spout $k$, such substances as rocks, sticks, cotton-bolls that are too large to pass through the meshes or perforations of the bottom $a$. It should be understood that the screen-bottom $a$ is much coarser in mesh or has larger perforations than the bottom $b$, and such foreign substances as cannot pass therethrough will be carried forward by the rotatable conveyer C and discharged through the spout $k$. The seed passing through the screen-bottom $a$ will fall into the trough or hopper B and will be carried forward by the rotatable conveyer D and discharged through the inclined spout $l$ to be taken up by the elevator E, while the bulk of sand and dirt that passed through the screen-bottom with the seed will find its way through the screen-bottom $b$. The seed being carried up by the elevator E will be discharged into the upper end of the casing G and fall onto the rotatable beater H, which beater is run at a sufficient speed to throw the seed violently against the adjustable deflector K, located immediately below it, the seed then falling by gravitation onto the rotatable beater I, which will throw the seed in like manner against the adjustable deflector K', which will very effectually dislodge all remaining dust from the fiber on the seed. As the rotatable beaters are closely housed by the casing G all dust accumulating between the beaters H and I will be driven out through the dust-flue L by means of the air-current produced by the air-forcing device O, which will cause a current of air to be forced through the ejector-pipe M, said pipe having a suitable valve $v$, so that the supply of air may be regulated, whereby the dust will be blown up through the dust-flue, but not the seed, said flue extending out of seed-storehouse where desirable. The seed are thrown over rotatable beater J, where the seed come in contact with the strong air-current from the rotatable blower or other air-forcing device O, which causes a suction in the upper portion of the spout P, causing the seed to be carried or forced upward through the conducting-pipe N, but allowing heavier particles, such as nails, &c., (which may have fallen through the screen-bottom $a$,) to drop into the spout P, where they may be removed at will by means of the slide $x$, the automatically-operating door Q guarding against "choke-ups," as hereinbefore described, allowing the seed to fall out of the spout through the door. When the seed passes into the conductor-pipe N, the seed will be blown upward through the pipe to the top of seed-house and distributed to any point desired through the spout at the end thereof or through the bottom, as hereinbefore described.

An apparatus constructed as herein described has many advantages over the means hereinbefore employed, as it is not only simple and practical as well as perfect in its operation, but the seed is thoroughly cleaned before it is stored, and the means employed for storing the seed entirely dispenses with overhead conveyers and saving a great amount of labor besides giving the damp seed a chance to dry by thinly scattering the seed over a large area, which cannot be done by overhead conveyers heretofore in use.

In describing the construction of the apparatus we wish it distinctly understood that many changes and modifications may be made without in any manner departing from the principle of the invention, and we do not desire, therefore, to be confined to any specific construction of the various devices or elements herein shown and described, and the apparatus may be used for cleaning and distributing all kinds of seed and grain, as well as cotton-seed.

Having now fully described our invention, what we claim as new, and desire to secure by Letters Patent, is—

1. An apparatus for cleaning cotton-seed, comprising two troughs or hoppers one arranged above the other and provided with suitable conveyers and screen-bottoms of different coarseness, the upper one of said troughs or hoppers having a discharge-spout and an elevator communicating with the lower one of the troughs or hoppers, a casing connecting with the casing of the elevator and rotatable beaters contained therein, substantially as and for the purpose set forth.

2. In an apparatus for cleaning cotton-seed, a suitable elevator, means for delivering the seed thereto, a casing communicating with the casing of the elevator, rotatable beaters contained within the casing, a dust-flue communicating with said casing, a conductor-pipe communicating with the casing of the rotatable beaters and an ejector-pipe communicating with the casing and with the conductor-pipe, an air-forcing device to force the air up through the conductor and ejector pipes, substantially as and for the purpose described.

3. In an apparatus for cleaning cotton-seed, a suitable elevator, means for delivering the seed thereto, a casing communicating with the casing of the elevator, rotatable beaters contained therein, a conductor-pipe and air-forcing device connecting therewith, and a spout communicating with the casing of the rotatable beaters and the conductor-pipe, and an automatically-operating door connecting with the spout, substantially as and for the purpose set forth.

4. An apparatus for cleaning cotton-seed, comprising troughs or hoppers having screen-bottoms and suitable conveyers, an elevator connecting with the lower one of the troughs or hoppers, a casing communicating with the casing of the elevator and rotatable beaters contained therein, adjustable deflectors connecting with said casing, a discharge-spout communicating with the lower end of the casing containing the beaters and provided with an automatically-acting door, a conductor-pipe communicating with the spout, and an air-forcing device connecting with the pipe, an ejector-pipe communicating with the casing of the beaters and the conductor-pipe and provided with a valve, and a dust-flue communicating with the casing, substantially as and for the purpose specified.

In testimony whereof we affix our signatures in presence of two witnesses.

DONOVAN STANSELL.
    XEN GEE.

Witnesses:
 N. B. GEE,
 FRED KISTLEY.